(12) United States Patent
Kita et al.

(10) Patent No.: US 6,291,101 B1
(45) Date of Patent: Sep. 18, 2001

(54) LITHIUM SECONDARY BATTERY

(75) Inventors: Koji Kita, Matsudo; Hiroshi Watanabe, Hirakata; Toshiyuki Nohma, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/267,220

(22) Filed: Mar. 12, 1999

(30) Foreign Application Priority Data

Mar. 12, 1998 (JP) .................................................. 10-082526

(51) Int. Cl.$^7$ ....................................................... H01M 4/58
(52) U.S. Cl. ...................... 429/231.1; 429/218.1
(58) Field of Search .............................. 429/218.1, 231.1, 429/231.2, 231.3

(56) References Cited

U.S. PATENT DOCUMENTS 5,618,640 * 4/1997 Idota et al. ............................ 429/194
5,707,756 * 1/1998 Inoue et al. ............................. 429/57

\* cited by examiner

*Primary Examiner*—Carol Chaney

(57) ABSTRACT

The present invention provides a lithium secondary battery using, as a lithium ion occluding agent for a negative electrode, a substantially amorphous oxide powder in which a product V·d of a total volume V in cm$^3$/g of pores with a diameter of 100 nm or less and a true density d in g/cm$^3$ measured by a helium displacement method is 0.1 through 0.5. Thus, the lithium secondary battery can attain an excellent charge-discharge cycle characteristic.

20 Claims, 1 Drawing Sheet

LITHIUM SECONDARY BATTERY

BACKGROUND OF THE INVENTION

This application claims the priority of Japanese Patent Application No. 10-82526 filed on Mar. 12, 1998, which is incorporated herein by reference.

The present invention relates to a lithium secondary battery comprising, as a lithium ion occluding agent for the negative electrode, a substantially amorphous oxide powder (hereinafter sometimes referred to as the "amorphous oxide powder"). More particularly, it relates to improvement of the amorphous oxide powder for the purpose of improving a charge-discharge cycle characteristic of the lithium secondary battery.

A lithium secondary battery can be improved in its voltage and capacity by appropriately selecting a positive electrode material because there is no need to consider a water decomposition voltage. Therefore, in accordance with recent development of portable and/or cordless electronic equipment, lithium secondary batteries have been regarded as a promising driving power supply for such electronic equipment.

As a negative electrode material for a lithium secondary battery, metallic lithium widely used in a lithium primary battery was initially regarded favorable. The usage of metallic lithium, however, was found to sometimes cause an internal short-circuit due to growth of lithium electrolytically deposited into the shape of branches on the surface of the negative electrode during charge.

Accordingly, carbon materials, such as graphite and coke, or oxides, which are free from the aforementioned disadvantage and can electrochemically occlude and discharge lithium ions during charge and discharge, are now used in practical batteries. In particular, graphite having the largest specific capacity among the carbon materials is a representative material used in a practical battery.

However, the amount of lithium ions to be occluded by graphite during charge is limited, and it is theoretically impossible to obtain graphite having a specific capacity exceeding 370 mAh/g. When such graphite is used in the negative electrode material, the resultant lithium secondary battery has difficulty in attaining a capacity sufficiently high for meeting a requirement of elongation of charge intervals.

On the other hand, some of oxides exhibit a considerably large specific capacity in the initial stage of charge-discharge cycles. When the charge-discharge cycles are repeated, however, such oxides can be easily degraded because their structures are broken due to strain derived from an internal stress caused in particles through repeated swelling and shrinkage.

Therefore, as means for stabilizing the structure of such an oxide during charge-discharge cycles, a variety of proposals have been made, for example, to provide an oxide with amorphousness or multicomponent including a combination of various elements.

For example, Japanese Laid-Open Patent Publication No. 7-288123/1995 discloses an amorphous oxide powder including two or more kinds of atoms selected from the group IIIb, IVb and Vb atoms, usable in the negative electrode material for a lithium secondary battery. It is reported that the resultant lithium secondary battery can thus attain a large capacity as well as a good charge-discharge cycle characteristic.

However, in this amorphous oxide powder, the specific capacity is still more largely degraded than that of graphite through repeated charge-discharge cycles, and there has been a demand for further improvement in this regard.

SUMMARY OF THE INVENTION

In view of the aforementioned conventional disadvantages and problems, an object of the invention is providing a lithium secondary battery with an excellent charge-discharge cycle characteristic using an amorphous oxide powder as a lithium ion occluding agent for the negative electrode. This object is achieved by using a specific amorphous porous oxide powder as the lithium ion occluding agent for the negative electrode.

Specifically, the lithium secondary battery of this invention comprises a substantially amorphous oxide powder as a lithium ion occluding agent for a negative electrode, and the substantially amorphous oxide powder is a porous oxide powder in which a product V·d of a total volume V in $cm^3/g$ of pores with a diameter of 100 nm or less and a true density d in $g/cm^3$ measured by a helium displacement method is 0.1 through 0.5.

Alternatively, the lithium ion occluding agent for a negative electrode of a lithium secondary battery of this invention comprises a substantially amorphous porous oxide powder in which a product V·d of a total volume V in $cm^3/g$ of pores with a diameter of 100 nm or less and a true density d in $g/cm^3$ measured by a helium displacement method is 0.1 through 0.5.

Thus, the invention provides a lithium secondary battery having an excellent charge-discharge cycle characteristic.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
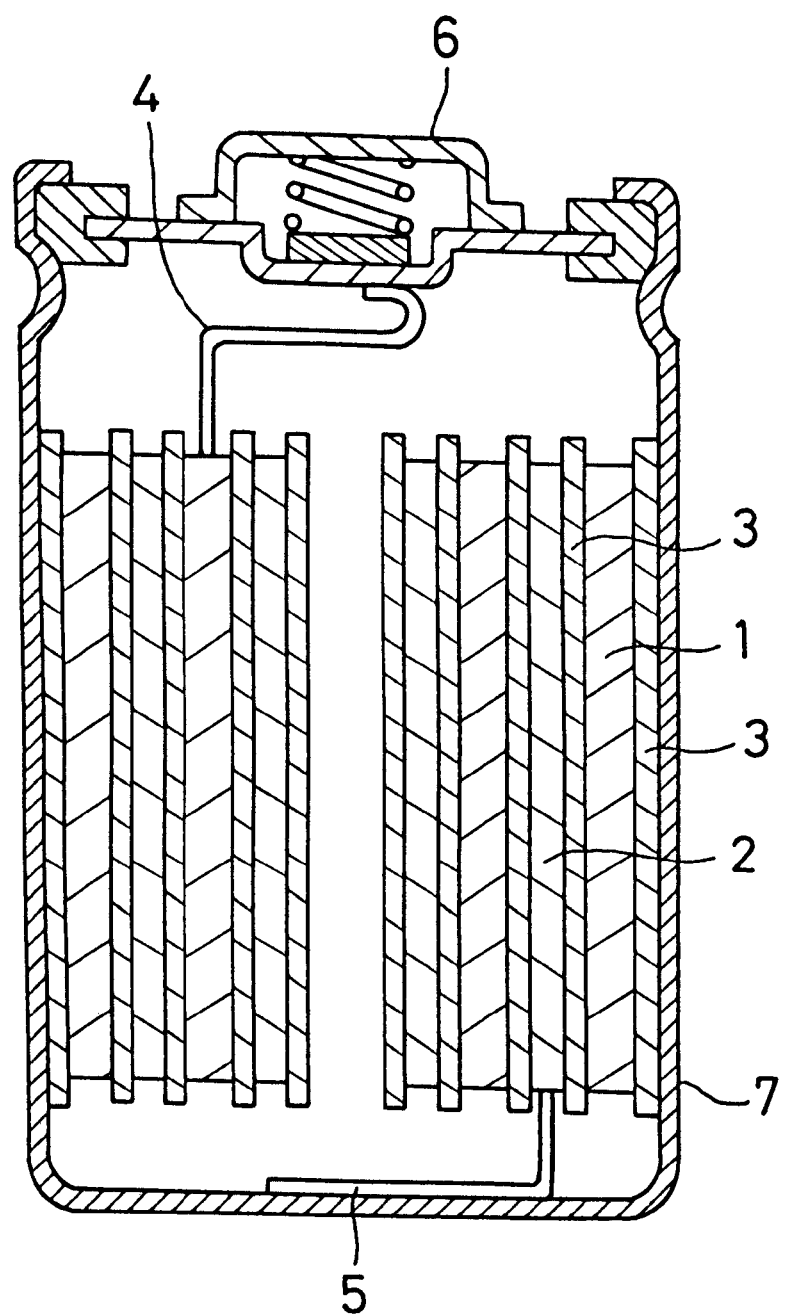
FIG. 1 is sectional view of a lithium secondary battery according to the present invention fabricated in an experiment.

A lithium secondary battery according to the present invention uses, as a lithium ion occluding agent for a negative electrode, a substantially amorphous porous oxide powder in which a product V·d of a total volume V (in $cm^3/g$) of pores with a diameter of 100 nm or less and a true density d (in $g/cm^3$) measured by a helium displacement method is 0.1 through 0.5.

The product V·d of the total volume V of the pores with a diameter of 100 nm or less and the true density d measured by the helium displacement method can be represented as V/(1/d), wherein V indicates the total volume of the pores with a diameter of 100 nm or less included in an oxide 1 g, and 1/indicates the volume of the oxide 1 g obtained in assuming that no pores are included. Accordingly, V/(1/d) accords with a proportion of the total volume of the pores with a diameter of 100 nm or less to the entire volume of the porous oxide including the pores, and is equal to the porosity of the oxide when the oxide does not include pores with a diameter exceeding 100 nm.

The lithium ion occluding agent for a negative electrode used in the present battery is the porous oxide powder wherein the product V·d is 0.1 through 0.5. In the case where the product V·d is smaller than 0.1, the internal stress occurring in accordance with the volume change caused during charge-discharge cycles cannot be sufficiently relaxed, and hence, the lithium ion occluding agent can be easily degraded due to its structure broken by the strain. As a result, it is difficult to obtain a lithium secondary battery with a good charge-discharge cycle characteristic. On the other hand, in the case where the product V·d exceeds 0.5, the mechanical strength of the porous oxide itself can be reduced. Therefore, also in this case, it is difficult to obtain a lithium secondary battery with a good charge-discharge cycle characteristic. Moreover, when the product V·d is too large, the packing density of the porous oxide powder can be reduced, resulting in decreasing the capacity of the battery. Accordingly, also from this point of view, the porous oxide powder with the product V·d smaller than 0.5 is practical.

Preferably, the porous oxide powder includes as few pores with a diameter exceeding 100 nm as possible. Specifically, a product V'·d of a total volume V' of pores with a diameter exceeding 100 nm and the true density d is preferably 0.6 or less. This is for the following reasons: When the powder includes pores with a diameter exceeding 100 nm, the effect of relaxing the internal stress occurring in accordance with the volume change during charge-discharge cycles is reduced as compared with the case where the powder includes the same amount of pores with a diameter of 100 nm or less. In addition, when the total volume of the pores with a diameter exceeding 100 nm is increased, the mechanical strength is reduced, resulting in degrading the charge-discharge cycle characteristic. Also, when the powder includes pores with a diameter exceeding 100 nm, the packing density of the porous oxide powder can be decreased, and hence, the capacity of the battery can be decreased. Also from this point of view, the number of pores with a diameter exceeding 100 nm is preferably as small as possible.

Also preferably, in the porous oxide powder, a proportion of a total volume V" of pores with a diameter of 10 nm or less to the total volume V of the pores with a diameter of 100 nm or less is 50% or more. This is for the following reasons: When the powder includes fine pores with a small diameter, the effect of relaxing the internal stress occurring in accordance with the volume change during charge-discharge cycles can be increased as compared with the case where the powder includes the same number of pores with a larger diameter. In addition, the mechanical strength is more difficult to reduce when a large number of fine pores with a smaller diameter are dispersed as compared with the case where a small number of pores with a larger diameter are scattered.

The porous oxide powder can be obtained by chemically removing a readily soluble phase from an amorphous oxide powder with a separate-phase structure consisting of the readily soluble phase and a slightly soluble phase. The amorphous oxide powder with the separate-phase structure can be prepared, for example, by heat-treating a homogeneous multicomponent amorphous oxide powder. The resultant separate-phase structure depends upon the heating temperature. Through so-called "spinodal decomposition" occurring in a heat treatment conducted at a temperature slightly lower than a glass transition point, a separate-phase structure in which two irregularly shaped phases are mutually entangled can be obtained. When one phase (that is, a readily soluble phase) is chemically removed from this amorphous oxide powder, the resultant porous oxide powder generally has a specific surface area, measured by a BET method, as larger as 10 m$^2$/g or more, and the specific capacity of such a powder scarcely decreases during charge-discharge cycles. The specific capacity is more difficult to decrease as the specific surface area is larger for the following reason: When the product V·d is the same, a porous oxide powder with a larger specific area includes a larger number of fine pores dispersed therein. Therefore, the internal stress occurring in accordance with the volume change in swelling and shrinkage can be effectively relaxed. It is noted that a too high heating temperature can make the readily soluble phase spherical. Although a porous oxide powder can be obtained from an amorphous oxide powder including such a spherical readily soluble phase, this porous oxide powder is generally difficult to attain a specific surface area exceeding 10 m$^2$/g.

The chemical removal of the readily soluble phase from the amorphous oxide powder is carried out by immersing the amorphous oxide powder in an acid or alkaline aqueous solution, so as to elute the readily soluble phase. The speed of eluting the readily soluble phase is largely varied depending upon the type and the concentration of the used acid solution (such as nitric acid, hydrochloric acid and sulfuric acid) or alkaline aqueous solution (such as sodium hydroxide aqueous solution and potassium hydroxide aqueous solution) and the composition of the readily soluble phase. Therefore, a solvent appropriate to the composition of the readily soluble phase is preferably used.

The composition of the porous oxide powder is not herein particularly specified. For example, the porous oxide powder can be made of an oxide including at least one element selected from the group consisting of Sn, Fe, W, Nb and Mo and at least one element selected from the group consisting of B, Si, Ge, P, As, Sb, V and Zr. The elements of the latter group are generally necessary for attaining amorphousness. In addition to the aforementioned elements, the oxide powder preferably includes an alkaline metal such as lithium, sodium and potassium and/or an alkaline earth metal such as magnesium, calcium and barium. When any of these elements is included, the amorphousness and the separate-phase structure can be more easily attained.

The present battery is characterized by using, as a lithium ion occluding agent for the negative electrode, a specific amorphous porous oxide powder. Accordingly, as materials for the other members such as a positive electrode and an electrolyte solution, any of the materials which have been practically used or proposed as members of a conventional lithium secondary battery can be used.

Examples of the positive electrode material include $LiCoO_2$, $LiNiO_2$ and $LiMn_2O_4$. An example of the electrolyte solution includes a solution obtained by dissolving an electrolytic salt such as $LiPF_6$, $LiClO_4$, $LiCF_3SO_3$ and $LiN(CF_3SO_2)_2$ in an organic solvent, such as ethylene carbonate, propylene carbonate, dimethyl carbonate and diethyl carbonate, in a concentration of 0.7 through 1.5 moles per liter.

Other features of the invention will become apparent in the course of the following descriptions of exemplary embodiments which are given for illustration of the invention and are not intended to be limiting thereof.

Experiment 1

Six types of batteries according to the invention and four types of comparative batteries were fabricated as follows for examining the discharge capacities and the charge-discharge cycle characteristics thereof.

Preparation of positive electrodes:

The positive electrode of each battery was prepared as follows: 95 parts by weight of a mixture including $LiCoO_2$, serving as a positive electrode active material, and artificial graphite, serving as a conducting agent, in a ratio by weight of 18:1, and 5 parts by weight of poly(vinylidene fluoride) dissolved in N-methyl-2-pyrrolidone were kneaded to give a slurry. The slurry was applied on both surfaces of an aluminum foil, serving as a collector, by a doctor blade method, and the resultant foil was dried under vacuum at a temperature of 150° C. for 2 hours.

Preparation of negative electrodes:

Preparation of porous oxide powders a1 through a3 and b1:

A mixture including $WO_2$, $SiO_2$, $B_2O_3$ and $Na_2O$ in an atomic ratio of W:Si:B:Na of 1:1:0.5:0.1 was charged in a platinum crucible and heated to 1000° C. to be molten. Then, the resultant was rapidly cooled at a cooling rate of approximately 100° C./min. The thus obtained material was crushed to give an amorphous oxide powder with glass-like luster having an average size of 5 $\mu$m.

The amorphous oxide powder was heated in an argon atmosphere at a temperature of 600° C., with the heating time changed among 1 hour, 2 hours, 5 hours and 10 hours. Thus, four types of amorphous oxide powders were obtained. Observation of these amorphous oxide powders with an electron microscope found all these powders have a separate-phase structure resulting from spinodal decomposition in which two phases are mutually entangled.

Each of the amorphous oxide powders with the separate-phase structure was immersed in a 5% diluted nitric acid heated to 60° C. for 2 hours to elute a readily soluble phase, and the resultant was dried. Thus, porous oxide powders a1 through a3 and b1 were obtained as the lithium ion occluding agents for the negative electrodes of the respective batteries. It was confirmed, through ICP emission spectrometry of the compositions of these porous oxide powders, that all the powders mainly comprise an oxide including W and Si in an atomic ratio of 1:1 and have small contents of B and Na. It is because the readily soluble phase consisting of an oxide including B and Na was eluted into nitric acid that the contents of B and Na were largely decreased. The ICP emission spectrometry is a qualitative or quantitative analyzing method in which a sample solution is sprayed in argon plasma excited by high frequency induction so as to analyze a spectral line emitted by excited atoms.

Preparation of porous oxide powders a4 through a6 and b2:

Porous oxide powders a4 through a6 and b2 were obtained in the same manner as described above with regard to the porous oxide powders a1 through a3 and b1 except that the heat treatment for obtaining amorphous oxide powders with the separate-phase structure in an argon atmosphere was conducted at a temperature of 700° C. instead of 600° C.

Preparation of nonporous oxide powders b3 and b4:

A mixture including $WO_2$, $SiO_2$, $B_2O_3$ and $Na_2O$ in an atomic ratio of W:Si:B:Na of 1:1:0.5:0.1 was charged in a platinum crucible and heated to 1000° C. to be molten. Then, the resultant was rapidly cooled at a cooling rate of approximately 100° C./min. The thus obtained material was crushed to give an amorphous nonporous oxide powder b3 with glass-like luster having an average size of 5 $\mu$m. Also, an amorphous nonporous oxide powder b4 with glass-like luster having an average particle size of 5 $\mu$m was obtained in the same manner as the nonporous oxide powder b3 except that the mixture was replaced with a mixture of $WO_2$ and $SiO_2$ in an atomic ratio of W:Si of 1:1. It is noted that "Inonporous oxide powder" herein does not mean an oxide powder having no pores at all but means an oxide powder not provided with porosity through a chemical treatment.

Then, 95 parts by weight of a mixture including any one of the porous oxides and the nonporous oxides and artificial graphite, serving as a conducting agent, in a ratio by weight of 9:1 and 5 parts by weight of an N-methyl-2-pyrrolidone solution including poly(vinylidene fluoride) were kneaded to give a slurry. The slurry was applied on the both surfaces of a copper foil, serving as a collector, by the doctor blade method, and the resultant foil was dried under vacuum at a temperature of 150° C. for 2 hours. Thus, the negative electrode of each battery was prepared.

Preparation of electrolyte solution:

The electrolyte solution of each battery was prepared by dissolving, in a concentration of 1 mole per liter, $LiPF_6$ in a mixed solvent including ethylene carbonate and diethyl carbonate in a ratio by volume of 1:1.

Fabrication of batteries:

Lithium secondary batteries A1 through A6 and B1 through B4 each in a cylindrical shape with an outer diameter of 18 mm and a height of 65 mm were fabricated by using the aforementioned positive and negative electrodes and electrolyte solution. In each battery, a microporous film of polypropylene having lithium ion permeability was used as a separator. The lithium secondary batteries A1 through A6 are batteries according to the invention respectively including the porous oxide powders a1 through a6, the lithium secondary batteries B1 and B2 are comparative batteries respectively including the porous oxide powders b1 and b2, and the lithium secondary batteries B3 and B4 are comparative batteries respectively including the nonporous oxide powders b3 and b4.

FIG. 1 is a schematic sectional view of the thus fabricated lithium secondary battery. The lithium secondary battery BA of FIG. 1 includes a positive electrode 1, a negative electrode 2, a separator 3 for separating the positive and negative electrodes, a positive electrode lead 4, a negative electrode lead 5, a positive electrode external terminal 6 and a negative electrode can 7. The positive electrode 1 and the negative electrode 2 are spirally wound with the separator 3 impregnated with the electrolyte solution sandwiched therebetween, so as to be housed in the negative electrode can 7. The positive electrode 1 is connected with the positive electrode external terminal 6 through the positive electrode lead 4, and the negative electrode 2 is connected with the negative electrode can 7 through the negative electrode lead 5, so that a chemical energy generated within the battery can be taken out as an electric energy.

Tables 1 through 3 list the following features of the respective lithium ion occluding agents (i.e., the porous oxides and the nonporous oxides) used in the negative electrodes of the respective batteries: A total volume per gram V (in $cm^3/g$) of pores with a diameter of 100 nm or less, a true density d (in $g/cm^3$) measured by a helium displacement method, a product V·d, a total volume V' (in $cm^3/g$) of pores having a diameter exceeding 100 nm, a total volume V" (in $cm^3/g$) of pores having a diameter of 10 nm or less, and a specific surface area (in $m^2/g$) obtained by a BET method (using nitrogen as an absorbed substance). The volumes V and V" were obtained by capillary condensation, and the volume V' was obtained by a mercury injection method. Volumes V, V' and V" described below were obtained in the same manner.

TABLE 1

| Battery | V (cm³/g) | d (g/cm³) | V · d | V' (cm³/g) | V" (cm³/g) | Specific surface area (m²/g) | Discharge capacity (mAh) | Capacity degradation ratio (%/cycle) |
|---|---|---|---|---|---|---|---|---|
| A1 | 0.026 | 4.60 | 0.12 | 0.042 | 0.019 | 11 | 1980 | 0.019 |
| A2 | 0.069 | 4.62 | 0.32 | 0.045 | 0.048 | 15 | 1900 | 0.017 |
| A3 | 0.098 | 4.66 | 0.46 | 0.048 | 0.065 | 17 | 1870 | 0.018 |
| B1 | 0.122 | 4.69 | 0.57 | 0.053 | 0.077 | 20 | 1720 | 0.034 |

TABLE 2

| Battery | V (cm³/g) | d (g/cm³) | V · d | V' (cm³/g) | V" (cm³/g) | Specific surface area (m²/g) | Discharge capacity (mAh) | Capacity degradation ratio (%/cycle) |
|---|---|---|---|---|---|---|---|---|
| A4 | 0.024 | 4.65 | 0.11 | 0.045 | 0.010 | 2 | 1970 | 0.025 |
| A5 | 0.062 | 4.67 | 0.29 | 0.047 | 0.025 | 3 | 1920 | 0.023 |
| A6 | 0.090 | 4.68 | 0.42 | 0.049 | 0.035 | 4 | 1900 | 0.023 |
| B2 | 0.117 | 4.69 | 0.55 | 0.052 | 0.041 | 5 | 1780 | 0.039 |

TABLE 3

| Battery | V (cm³/g) | d (g/cm³) | V · d | V' (cm³/g) | V" (cm³/g) | Specific surface area (m²/g) | Discharge capacity (mAh) | Capacity degradation ratio (%/cycle) |
|---|---|---|---|---|---|---|---|---|
| B3 | 0.007 | 4.32 | 0.03 | 0.005 | 0.001 | 0.4 | 1990 | 0.051 |
| B4 | 0.004 | 4.70 | 0.02 | 0.002 | 0.001 | 0.3 | 1980 | 0.057 |

Discharge capacity and charge-discharge cycle characteristic of each battery:

With regard to each battery, 200 charge-discharge cycles were run at room temperature (approximately 25° C.), in each cycle of which the battery was charged to 4.1 V at 200 mA and discharged to 2.75 V at 200 mA. Thus, a discharge capacity (mAh) in the first cycle and an average capacity degradation ratio per cycle (%/cycle) up to the 200th cycle defined by the following formula were obtained. The thus obtained capacities and ratios of the respective batteries were also listed in Tables 1 through 3.

Capacity degradation ratio={(discharge capacity in 1st cycle–discharge capacity in 200th cycle)/discharge capacity in 1st cycle}÷199(cycles)×100

As is shown in Tables 1 through 3, the present batteries A1 through A6 have smaller capacity degradation ratios than the comparative batteries B1 through B4, exhibiting good charge-discharge cycle characteristics. The discharge capacities of the present batteries A1 through A6 are substantially equal to those of the comparative batteries B3 and B4. Among the present batteries A1 through A6, the batteries A1 through A3 have smaller capacity degradation ratios in particular, exhibiting excellent charge-discharge cycle characteristics. This is for the following reason: In the present batteries A1through A3 each using the porous oxide powder having a larger specific surface area, namely, in which a large number of smaller pores are dispersed, the internal stress caused by the volume change occurring during charge-discharge cycles can be more effectively relaxed as compared with that caused in the batteries A4 through A6 each using the porous oxide powder having a smaller specific surface area, namely, including larger pores. Accordingly, the structures of the porous oxide powders used in the batteries A1 through A3 are hard to break and degrade. The specific surface areas of the porous oxide powders used in the batteries A4 through A6 are small because the heating temperature for obtaining the amorphous oxides with the separate-phase structure was too high to cause the spinodal decomposition, resulting in forming a readily soluble phase in a spherical shape. The comparative batteries B1 and B2 have large capacity degradation ratios because the porous oxide powder used therein are poor in their mechanical strength. Also, the discharge capacities of these batteries in the first cycle are small because the packing density of the porous oxide powders is small. The comparative batteries B3 and B4 have very large capacity degradation ratios because the nonporous oxide powders used therein include a very small number of pores for relaxing the internal stress caused in the particles during swelling and shrinkage in charge and discharge, and therefore, their structures are rapidly broken.

Experiment 2

Three types of batteries according to the invention and three types of comparative batteries were fabricated for examining the discharge capacities and the charge-discharge cycle characteristics thereof.

Preparation of porous oxide powders a7 through a9:

A mixture of $Fe_2O_3$, $SiO_2$, $B_2O_3$ and $Na_2O$ in an atomic ratio of Fe:Si:B:Na of 1:1:0.5:0.1, a mixture of $MoO_2$, $P_2O_2$, $B_2O_3$ and $K_2O$ in an atomic ratio of Mo:P:B:K of 1:1:0.5:01, and a mixture of $Nb_2O_3$, $P_2O_5$, $B_2O_3$ and $K_2O$ in an atomic ratio of Nb:P:B:K of 1:1:0.5:0.1 were respectively charged in platinum crucibles and heated to a temperature of 1000° C. to be molten, and were rapidly cooled at a cooling rate of approximately 100° C./min. The resultant materials were crushed to give three types of amorphous oxide powders with glass-like luster having an average particle size of 5 μm.

Each of the amorphous oxide powders was heat-treated at a temperature of 600° C. for 2 hours in an argon atmosphere, resulting in obtaining three types of amorphous oxide powders with the separate-phase structure. Observation with an electron microscope found that all the amorphous oxide powders had separate-phase structure resulting from the spinodal decomposition in which two phases were mutually entangled.

Each of the amorphous oxide powders with the separate-phase structure was immersed in a 5% diluted nitric acid heated to a temperature of 60° C. for 2 hours to elute a readily soluble phase, and the resultant was dried. Thus, three types of porous oxide powders a7 through a9 usable as lithium ion occluding agents for negative electrodes were obtained. It was confirmed, through the ICP emission spectrometry of the compositions of the respective porous oxide powders, that the respective powders have very small contents of B and Na (or K) and mainly include an oxide including Fe and Si, Mo and P, or Nb and P in an atomic ratio of 1:1.

Preparation of nonporous oxide powders b5 through b7:

A mixture of $Fe_2O_3$ and $SiO_2$ in an atomic ratio of Fe:Si of 1:1, a mixture of $MoO_2$ and $P_2O_5$ in an atomic ratio of Mo:P of 1:1, and a mixture of $Nb_2O_3$ and $P_2O_5$ in an atomic ratio of Nb:P of 1:1 were respectively charged in platinum crucibles and heated to a temperature of 1000° C. to be molten, and were rapidly cooled at a cooling rate of approximately 100° C./min. The resultant materials were crushed to give three types of amorphous nonporous oxide powders b5 through b7 with glass-like luster having an average particle size of 5 μm. It was confirmed, through the ICP emission spectrometry of the compositions of the nonporous oxide powders, that the respective powders mainly include all oxide including Fe and Si, Mo and P, or Nb and P in an atomic ratio of 1:1.

Fabrication of batteries:

Lithium secondary batteries A7 through A9 and B5 through B7 were fabricated in the same manner as in Experiment 1 except that the aforementioned porous oxide powders and the nonporous oxide powders were used as the lithium ion occluding agents for the negative electrodes of the respective batteries. The lithium secondary batteries A7 through A9 are batteries according to the invention respectively using the porous oxide powders a7 through a9, and the lithium secondary batteries B5 through B7 are comparative batteries respectively using the nonporous oxide powders b5 through b7.

Table 4 lists the following features of the lithium ion occluding agents (i.e., the porous oxides and the nonporous oxides) used in the negative electrodes of the respective batteries: A total volume per gram V (in $cm^3/g$) of pores having a diameter of 100 nm or less, a true density d (in $g/cm^3$) measured by the helium displacement method, a product V·d, a total volume V' (in $cm^3/g$) of pores having a diameter exceeding 100 nm, a total volume V" (in $cm^3/g$) of pores having a diameter of 10 nm or less, and a specific surface area (in $m^2/g$) obtained by the BET method (using nitrogen as an absorbed substance).

TABLE 4

| Battery | V ($cm^3/g$) | d ($g/cm^3$) | V · d | V' ($cm^3/g$) | V" ($cm^3/g$) | Specific surface area ($m^2/g$) | Discharge capacity (mAh) | Capacity degradation ratio (%/cycle) |
|---|---|---|---|---|---|---|---|---|
| A7 | 0.080 | 4.15 | 0.33 | 0.053 | 0.054 | 16 | 1920 | 0.018 |
| A8 | 0.076 | 4.84 | 0.37 | 0.055 | 0.052 | 19 | 1870 | 0.017 |
| A9 | 0.075 | 4.82 | 0.36 | 0.052 | 0.047 | 18 | 1880 | 0.019 |
| B5 | 0.004 | 4.67 | 0.02 | 0.053 | 0.001 | 0.5 | 1930 | 0.063 |
| B6 | 0.008 | 5.01 | 0.04 | 0.057 | 0.001 | 0.2 | 1880 | 0.076 |
| B7 | 0.008 | 4.98 | 0.04 | 0.052 | 0.001 | 0.3 | 1890 | 0.061 |

Discharge capacity and charge-discharge cycle characteristic of each battery:

With regard to each battery, 200 charge-discharge cycles were run under the same conditions as in Experiment 1, so as to obtain a discharge capacity (mAh) in the first cycle and an average capacity degradation ratio per cycle (%/cycle) up to the 200th cycle. The obtained capacities and the ratios of the respective batteries are also listed in Table 4.

As is shown in Table 4, the present batteries A7 through A9 have smaller capacity degradation ratios as compared with the comparative batteries B5 through B7, exhibiting a good charge-discharge cycle characteristic. Also, the discharge capacities of the present batteries A7 through A9 are substantially equal to those of the comparative batteries B5 through B7.

On the basis of the results of Experiments 1 and 2, it is obvious that the porous oxide powder of this invention can improve the charge-discharge cycle characteristic while minimizing the decrease in the discharge capacity.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising a substantially amorphous oxide powder as a lithium ion occluding agent for a negative electrode, the substantially amorphous oxide powder being a porous oxide powder which is a composite oxide powder including at least one element selected from the group consisting of Sn, Fe, W, Nb and Mo and at least one element selected from the group consisting of B, Si, Ge, P, As, Sb, V and Zr in which a product V·d of a total volume V in $cm^3/g$ of pores with a diameter of 100 nm or less and a true density d in $g/cm^3$ measured by a helium displacement method is 0.1 through 0.5.

2. The lithium secondary battery according to claim 1, wherein a proportion of a total volume V" of pores having a diameter of 10 nm or less to the total volume V of the pores having a diameter of 100 nm or less is 50% or more in the porous oxide powder.

3. The lithium secondary battery according to claim 1, wherein the porous oxide powder has a specific surface area obtained by a BET method of 10 $m^2/g$ or more.

4. The lithium secondary battery according to claim 1, wherein a product V'·d of a total volume V' in $cm^3/g$ of pores having a diameter exceeding 100 nm and the true density d in $g/cm^3$ is 0.6 or less in the porous oxide powder.

5. The lithium secondary battery according to claim 1,
wherein the porous oxide powder is prepared by chemically removing a readily soluble phase from a substantially amorphous oxide powder having a separate-phase structure including the readily soluble phase and a slightly soluble phase.

6. A lithium ion occluding agent for a negative electrode of a lithium secondary battery comprising a substantially amorphous oxide powder which is a composite oxide powder including at least one element selected from the group consisting of Sn, Fe, W, Nb and Mo and at least one element selected from the group consisting of B, Si, Ge, P, As, Sb, V and Zr in which a product V·d of a total volume V in $cm^3/g$ of pores with a diameter of 100 nm or less and a true density d in $g/cm_3$ measured by a helium displacement method is 0.1 through 0.5.

7. The lithium ion occluding agent for a negative electrode of a lithium secondary battery according to claim 6,
wherein a proportion of a total volume V" of pores having a diameter of 10 nm or less to the total volume V of the pores having a diameter of 100 nm or less is 50% or more in the porous oxide powder.

8. The lithium ion occluding agent for a negative electrode of a lithium secondary battery according to claim 6,
wherein the porous oxide powder has a specific surface area obtained by a BET method of 10 $m^2/g$ or more.

9. The lithium ion occluding agent for a negative electrode of a lithium secondary battery according to claim 6,
wherein a product V'·d of a total volume V' in $cm^3/g$ of pores having a diameter exceeding 100 nm and the true density d in $g/cm^3$ is 0.6 or less in the porous oxide powder.

10. The lithium ion occluding agent for a negative electrode of a lithium secondary battery according to claim 6,
wherein the porous oxide powder is prepared by chemically removing a readily soluble phase from a substantially amorphous oxide powder having a separate-phase structure including the readily soluble phase and a slightly soluble phase.

11. A lithium secondary battery comprising a substantially amorphous oxide powder as a lithium ion occluding agent for a negative electrode, the substantially amorphous oxide powder being a porous oxide powder which is a composite oxide powder including at least one element selected from the group consisting of Sn, Fe, W, Nb and Mo and at least one element selected from the group consisting of B, Si, Ge, P, As, Sb, V and Zr, and an alkaline metal and/or an alkaline earth metal in which a product V·d of a total volume V in $cm^3/g$ of pores with a diameter of 100 nm or less and a true density d in $g/cm^3$ measured by a helium displacement method is 0.1 through 0.5.

12. The lithium secondary battery according to claim 11,
wherein a proportion of a total volume V" of pores having a diameter of 10 nm or less to the total volume V of the pores having a diameter of 100 nm or less is 50% or more in the porous oxide powder.

13. The lithium secondary battery according to claim 11,
wherein the porous oxide powder has a specific area obtained by a BET method of 10 m/g or more.

14. The lithium secondary battery according to claim 11,
wherein a product V'·d of total volume V' in $cm^3/g$ of pores having a diameter exceeding 100 nm and the true density d in $g/cm^3$ is 0.6 or less in the porous oxide powder.

15. The lithium secondary battery according to claim 11,
wherein the porous oxide powder is prepared by chemically removing a readily soluble phase from a substantially amorphous oxide powder having a separate-phase structure including the readily soluble phase and a slightly soluble phase.

16. A lithium ion occluding agent for a negative electrode of a secondary battery comprising a substantially amorphous oxide powder which is a composite oxide powder including at least one element selected from the group consisting of Sn, Fe, W, Nb and Mo and at least one element selected from the group consisting of B, Si, Ge, P, As, Sb, V and Zr, and an alkaline metal and/or an alkaline earth metal in which a product V·d of a total volume V in $cm^3/g$ of pores with a diameter of 100 nm or less and a true density d in $g/cm^3$ measured by a helium displacement method is 0.1 through 0.5.

17. A lithium ion occluding agent for a negative electrode of a secondary battery according to claim 16, wherein a proportion of a total volume V" of pores having a diameter of 10 nm or less to the total volume V of the pores having a diameter of 100 nm or less is 50% or more in the porous oxide powder.

18. A lithium ion occluding agent for a negative electrode of a secondary battery according to claim 16, wherein the porous oxide powder has a specific area obtained by a BET method of 10 $m^2/g$ or more.

19. A lithium ion occluding agent for a negative electrode of a secondary battery according to claim 16, wherein a product V'·d of total volume V' in $cm^3/g$ of pores having a diameter exceeding 100 nm and the true density d in $g/cm^3$ is 0.6 or less in the porous oxide powder.

20. A lithium ion occluding agent for a negative electrode of a secondary battery according to claim 16, wherein the porous oxide powder is prepared by chemically removing a readily soluble phase from a substantially amorphous oxide powder having a separate-phase structure including the readily soluble phase and a slightly soluble phase.

* * * * *